United States Patent [19]

Ban et al.

[11] Patent Number: 4,929,667

[45] Date of Patent: May 29, 1990

[54] URETHANE PREPOLYMER COMPOSITION AND A POLYURETHANE COATING COMPOSITION SYSTEM

[75] Inventors: Kazuki Ban; Norio Oyabu, both of Nobeoka, Japan

[73] Assignee: Asahi Kasei Kogyo Kabushiki Kaisha, Osaka, Japan

[21] Appl. No.: 304,607

[22] Filed: Feb. 1, 1989

[30] Foreign Application Priority Data

Feb. 1, 1988 [JP] Japan .................................. 63-19542

[51] Int. Cl.$^5$ .......................................... C08G 18/10
[52] U.S. Cl. .................................. 524/718; 524/720; 524/738; 524/739; 525/458; 252/182.22
[58] Field of Search ............... 524/718, 720, 738, 739; 525/458; 252/182.22

[56] References Cited

U.S. PATENT DOCUMENTS

| | | | |
|---|---|---|---|
| 3,746,665 | 7/1973 | Koleske et al. | 260/2.5 |
| 3,899,292 | 8/1975 | Okazaki et al. | 8/17 |
| 3,919,351 | 11/1975 | Chang et al. | 260/850 |
| 4,131,605 | 12/1978 | Ammons | 528/77 |
| 4,182,898 | 1/1980 | Fujiwara et al. | 560/26 |
| 4,241,140 | 12/1980 | Ammons | 428/339 |
| 4,374,210 | 2/1983 | Ewen et al. | 521/159 |

FOREIGN PATENT DOCUMENTS

| | | |
|---|---|---|
| 48-32563 | 10/1973 | Japan . |
| 54-60395 | 5/1979 | Japan . |
| 58-32662 | 2/1983 | Japan . |
| 58-59213 | 4/1983 | Japan . |
| 61-12753 | 1/1986 | Japan . |
| 62-169864 | 7/1987 | Japan . |
| 62-53525 | 11/1987 | Japan . |
| 2014593 | 8/1979 | United Kingdom . |

*Primary Examiner*—Maurice J. Welsh
*Attorney, Agent, or Firm*—Birch, Stewart, Kolasch & Birch

[57] ABSTRACT

A urethane prepolymer composition is provided comprising (a) a terminal isocyanate group-containing urethane prepolymer derived from a polytetramethylene glycol having a specific molecular weight of 700 to 1500 and an aliphatic and/or alicyclic diisocyanate and (b) a terminal isocyanate group-containing urethane prepolymer derived from a polycaprolactone diol and/or polyol having a specific molecular weight of 500 to 1500 and an aliphatic and/or alicyclic diisocyanate, the weight ratio of (a) to (b) being in the range of 80/20 to 20/80. This composition has excellent compatibility with a diol compound and/or a polyol compound, and can be formulated together with the diol compound and/or the polyol compound into a polyurethane coating composition system which forms a coating film having not only excellent weathering resistance, elastic recovery and transparency but also excellent low-temperature physical properties such as mechanical strength, flexibility and impact resistance at low temperatures, e.g., −30° C. The composition system is useful for protecting and providing a good appearance to resin products, such as polyurethane bumpers and facing materials for buildings.

14 Claims, No Drawings

URETHANE PREPOLYMER COMPOSITION AND A POLYURETHANE COATING COMPOSITION SYSTEM

BACKGROUND OF THE INVENTION

1. Field of the Invention

The present invention relates to a urethane prepolymer composition and a polyurethane coating composition system. More particularly, the present invention is concerned with a urethane prepolymer composition which comprises in specific weight proportions a terminal isocyanate group-containing urethane prepolymer derived from a polytetramethylene glycol having a specific molecular weight and a terminal isocyanate group-containing urethane prepolymer derived from a terminal hydroxyl group-containing polycaprolactone having a specific molecular weight. Also, the present invention is concerned with a polyurethane coating composition system which comprises the above-mentioned urethane prepolymer composition and a compound having at least two hydroxyl groups. The urethane prepolymer composition and the hydroxyl group-containing compound are separately provided and adapted to being mixed when used. When the urethane prepolymer composition and the hydroxyl group-containing compound are mixed and applied to a substrate, polyurethane formation reaction occurs, and a coating film having not only excellent transparency, elastic recovery and weathering resistance but also excellent low-temperature physical properties, e.g., mechanical strength, flexibility and impact resistance at low temperatures, is produced. Especially advantageous application of the present polyurethane coating composition system is found in the coating of resin products, such as polyurethane bumpers and facing materials for buildings.

2. Discussion of Related Art

The use of a resin product in place of a metal product, such as a steel plate, has been increasing in recent years in various fields. For example, this is notable in the field of automobile parts. The use of resin-made automobile parts, e.g., a polyurethane bumper, is remarkably increasing due to their advantages in safety, light weight, shock absorption, etc. However, generally, the resin product is susceptible to discoloration and performance lowering by outdoor exposure for a prolonged period of time. To alleviate the discoloration and performance lowering of a resin substrate, a coating composition is usually applied to the resin substrate. The coating composition is required to be capable of forming a coating film resistant to severe conditions to which for example, an automobile is exposed, and also required to be capable of forming a coating film having not only excellent weathering resistance, elastic recovery and adhesion but also excellent low-temperature physical properties, e.g., mechanical strength, flexibility and impact resistance at low temperatures, e.g., $-30°$ C.

With a view toward developing such a desirable coating composition, various proposals have been made. For example, it was proposed in Japanese Patent Application Publication Specification No. 48-32563 to use a one-pack coating composition of baking type which comprises a polyurethane resin having a terminal hydroxyl group and an aminoplast resin and which is baked to effect crosslinking of the resin. However, this coating composition has drawbacks in that baking must be performed at high temperatures, and in that the coating derived from the composition has poor flexibility at low temperatures.

In Japanese Patent Application Laid-Open Specification No. 58-32662, it was proposed to add a polycaprolactone diol or polyol as an additive to the so-called two-pack polyurethane coating composition system which is suited for use in coating a steel plate body for an automobile but poor in elastic properties of the coating derived from the composition, so as to provide a coating composition system capable of forming a coating having improved elastic properties so that it can advantageously be used for coating a resin product, such as a polyurethane bumper. In this coating composition system, in addition to the diol or polyol to be used as a main component (such as an acrylic polyol and a polyester diol or polyol) and the so-called curing agent (such as an isocyanurate trimer of 1,6-hexamethylene diisocyanate, a biuret adduct of 1,6-hexamethylene diisocyanate, and an isocyanurate trimer of isophorone diisocyanate), a polycaprolactone diol or polyol is employed as an additive. Since the additive also has a hydroxyl group, it is necessary to adjust the ratio of the main component diol or polyol to the curing agent in accordance with the amount of the additive so as to maintain the NCO/OH ratio at an appropriate value. This is not facile and is likely to cause the NCO/OH ratio to be inappropriate. In addition, the polycaprolactone diol or polyol is effective for improving the elastic properties at low temperatures of the coating derived from the composition, only when the diol or polyol is added in a large amount. However, the addition of the polycaprolactone diol or polyol in a large amount is likely to cause the coating derived from the composition to have poor weathering resistance.

In Japanese Patent Application Laid-Open Specification No. 58-59213 and Japanese Patent Application Publication Specification No. 62-53525, it is described that a linear polyurethane elastomer produced by reacting a copolymer diol or polyol derived from a polytetramethylene glycol and a caprolactone with a diisocyanate has excellent hydrolysis resistance and low-temperature physical properties. However, this linear polyurethane elastomer cannot be used in fields where the coating film must have a high level of resistance to weathering, solvents, etc.

Japanese Patent Application Laid-Open Specification No. 61-12753 discloses a urethane prepolymer obtained by reacting a polycaprolactone diol or polyol having a specific number average molecular weight with an aliphatic or alicyclic diisocyanate. The specification also discloses that when the above-identified prepolymer is mixed with an acrylic polyol, a polyurethane coating composition system can be obtained, in which even though the acrylic polyol has a relatively high glass transition temperature, the polyol has good compatibility with the prepolymer, so that the polyurethane coating composition system can provide a coating film having high elongation and excellent weathering resistance. However, the coating film disclosed in the specification does not have desirable low-temperature physical properties. For example, it has poor elongation at low temperatures, such as $-30°$ C.

Japanese Patent Application Laid-Open Specification No. 54-60395 discloses a urethane prepolymer produced by reacting a polytetramethylene glycol with a diisocyanate at an NCO/OH equivalent ratio of 2. However, this prepolymer disadvantageously has high viscosity so that the processing thereof is difficult. In addition, the prepolymer has poor compatibility with a diol or polyol.

As apparent from the foregoing, all of the proposed prepolymers and coating composition systems prepared using the same have problems. The use of a resin product in place of a metal product, such as a steel plate, has been increasing in various fields in recent years. Therefore, there is still a strong demand in the art for a prepolymer which is useful for preparing a two-pack coating composition system which can be advantageously utilized for protecting and providing a good appearance to resin products.

SUMMARY OF THE INVENTION

The present inventors have made extensive and intensive studies with a view toward developing a urethane prepolymer which is useful for preparing a two-pack coating composition system which can be advantageously utilized for protecting and providing a good appearance to resin products, such as polyurethane bumpers or facing materials for buildings. As a result, the present inventors have unexpectedly found that a mixture of a urethane prepolymer derived from a polytetramethylene glycol having a specific molecular weight and a urethane prepolymer derived from a polycaprolactone diol or polyol having a specific molecular weight in specific weight proportions has good compatibility with a diol or polyol, and can be formulated together with the diol or polyol into an advantageous polyurethane coating composition system capable of forming a coating film which is excellent not only in weathering resistance, transparency and elastic recovery but also in low-temperature physical properties, such as mechanical strength, flexibility and impact resistance. Based on this novel finding, the present invention has been completed.

It is, therefore, an object of the present invention to provide a urethane prepolymer composition which has excellent compatibility with a compound having at least two hydroxyl groups, and which can be formulated together with the compound to form an excellent polyurethane coating composition system as mentioned below.

It is another object of the present invention to provide a polyurethane coating composition system which is capable of forming a coating film having not only excellent weathering resistance, transparency and elastic recovery but also excellent lowtemperature physical properties, such as mechanical strength, flexibility and impact resistance at low temperatures, e.g., −30° C. The composition system is useful for protecting and providing a good appearance to resin products, such as polyurethane bumpers and facing materials for buildings.

The foregoing and other objects, features and advantages of the present invention will be apparent to those skilled in the art from the following detailed description and appended claims.

DETAILED DESCRIPTION OF THE INVENTION

In one aspect of the present invention, there is provided a urethane prepolymer composition comprising:

(a) a terminal isocyanate group-containing urethane prepolymer obtained by reacting a polytetramethylene glycol having a number average molecular weight of from 700 to 1500 with at least one diisocyanate selected from the group consisting of an aliphatic diisocyanate and an alicyclic diisocyanate at an equivalent ratio of the isocyanate groups of said diisocyanate to the hydroxyl groups of said glycol of at least 5/1, and (b) a terminal isocyanate group-containing urethane prepolymer obtained by reacting at least one polycaprolactone having at least two terminal hydroxyl groups, the polycaprolactone being selected from the group consisting of a polycaprolactone diol and a polycaprolactone polyol each having a number average molecular weight of from 500 to 1500, with at least one diisocyanate selected from the group consisting of an aliphatic diisocyanate and an alicyclic diisocyanate at an equivalent ratio of the isocyanate groups of said diisocyanate to the hydroxyl groups of said polycaprolactone of at least 5/1, the weight ratio of (a) to (b) being in the range of from 80/20 to 20/80.

The above-mentioned urethane prepolymer composition has excellent compatibility with a compound having at least two hydroxyl groups, and can be formulated together with the compound to form a polyurethane coating composition system which is capable of forming a coating film having excellent properties, particularly having excellent weathering resistance, transparency and elastic recovery, and low-temperature physical properties, such as mechanical strength, flexibility and impact resistance at low temperatures, e.g., −30° C. The composition system is useful for protecting and providing a good appearance to resin products, such as polyurethane bumpers and facing materials for buildings.

Accordingly, in another aspect of the present invention, there is provided a polyurethane coating composition system comprising components (A) and (B), in which said components are separately provided and are adapted to being mixed when used, wherein said components are defined as follows:

(A) a urethane prepolymer composition comprising:
  (a) a terminal isocyanate group-containing urethane prepolymer obtained by reacting a polytetramethylene glycol having a number average molecular weight of from 700 to 1500 with at least one diisocyanate selected from the group consisting of an aliphatic diisocyanate and an alicyclic diisocyanate at an equivalent ratio of the isocyanate groups of said diisocyanate to the hydroxyl groups of said glycol of at least 5/1, and
  (b) a terminal isocyanate group-containing urethane prepolymer obtained by reacting at least one polycaprolactone having at least two terminal hydroxyl groups, the polycaprolactone being selected from the group consisting of a polycaprolactone diol and a polycaprolactone polyol each having a number average molecular weight of from 500 to 1500 with at least one diisocyanate selected from the group consisting of an aliphatic diisocyanate and an alicyclic diisocyanate at an equivalent ratio of the isocyanate groups of said diisocyanate to the hydroxyl groups of said polycaprolactone of at least 5/1,
  the weight ratio of (a) to (b) being in the range of from 80/20 to 20/80; and (B) at least one compound having at least two hydroxyl groups, the compound being selected from the group consisting of a diol compound and a polyol compound, wherein the equivalent ratio of the total number of the terminal isocyanate groups of (a) and (b) to the hydroxyl groups of component (B) is in the range of from 0.5/1 to 2.0/1.

In the present invention, at least one diisocyanate selected from the group consisting of an aliphatic diisocyanate and an alicyclic diisocyanate is used as the material to be reacted with a polymethylene glycol and with at least one polycaprolactone having at least two terminal hydroxyl groups for preparing prepolymers (a) and (b), respectively. It is preferred that the aliphatic and alicyclic diisocyanates of (a) and (b), respectively, have 4 to 30 and 8 to 30 carbon atoms.

Examples of aliphatic diisocyanates and alicyclic diisocyanates include 1,4-tetramethylene diisocyanate, 1,5-pentamethylene diisocyanate, 1,6-hexamethylene diisocyanate, 2,2,4-trimethyl-1,6-hexamethylene diisocyanate, lysine diisocyanate, isophorone diisocyanate, 1,3-bis(isocyanatomethyl)cyclohexane, 4,4'-dicyclohexylmethane diisocyanate and the like. Of these, 1,6-hexamethylene diisocyanate is most preferred from the standpoints of its commercial availability and its capability of providing a prepolymer composition suited for use in preparation of a coating composition system which forms a coating film having excellent weathering resistance.

Various polyether diols or polyols have conventionally been employed as a material to be reacted with a diisocyanate in the production of a urethane prepolymer of polyether type. For example, a homopolymer or copolymer of ethylene oxide or propylene oxide and a polytetramethylene glycol obtained by polymerization of tetrahydrofuran have been employed. However, in the present invention, it is essential to employ polytetramethylene glycol having a number average molecular weight of 700 to 1500 as a material for preparing prepolymer (a). The use of such a specific polytetramethylene glycol is advantageous for obtaining an ultimate coating film which is not only excellent in water resistance and elastic recovery but also has low glass transition temperature so that it has excellent low-temperature physical properties, such as excellent elongation, impact strength and flexibility at low temperatures. The polytetramethylene glycol to be used in the present invention must have a number average molecular weight of from 700 to 1500, as mentioned above. The determination method of the number average molecular weight of the polytetramethylene glycol is described later. When a polytetramethylene glycol having a number average molecular weight of less than 700 is used, the ultimate coating film is poor in elongation at low temperatures. On the other hand, when a polytetramethylene glycol having a number average molecular weight of greater than 1500 is used, the resulting urethane prepolymer composition has low NCO content so that the solubility of the composition in a solvent is poor. This causes the use of such a urethane prepolymer composition to be impractical.

The polytetramethylene glycol to be used in the present invention may preferably be produced by cationic polymerization of tetrahydrofuran in the presence of a catalyst. As the catalyst, there may be used acetic anhydride-perchloric acid, fluorosulfonic acid, fuming sulfuric acid and the like. In particular, the polytetramethylene glycol may be produced as follows. Fluorosulfonic acid is added to tetrahydrofuran in an amount of about 1 to 30% by weight, based on the amount of tetrahydrofuran, and the resultant mixture is kept at 5 to 65° C. for several minutes to several tens of hours so that the reaction is allowed to proceed. The molecular weight of the polytetramethylene glycol can be regulated by controlling the reaction conditions, such as reaction temperature, reaction period and the amount of catalyst. Commercially available polytetramethylene glycols may also be used. Examples of commercially available polytetramethylene glycols include PTG650, PTG1000, PTG1500, PTG1800 (tradenames of products manufactured and sold by Hodogaya Chemical Co., Ltd., Japan) and the like.

On the other hand, various polyester diols or polyols have conventionally been employed as a material to be reacted with a diisocyanate in the production of a urethane prepolymer of polyester type. For example, polyester diols or polyols, such as those produced from a glycol (e.g., ethylene glycol, 1,4-butylene glycol and 1,6-hexylene glycol) and an acid (e.g., adipic acid and isophthalic acid) have been employed. However, in the present invention, it is essential to employ at least one polycaprolactone having at least two terminal hydroxyl groups selected from the group consisting of a polycaprolactone diol and a polycaprolactone polyol each having a number average molecular weight of from 500 to 1500 as a material for preparing prepolymer (b). The use of such a specific polycaprolactone is advantageous for obtaining a coating film which is excellent in water resistance and weathering resistance. In the present invention, the number average molecular weight of each of the polycaprolactone diol and polyol is in the range of from 500 to 1500, as mentioned above. The determination method of the number average molecular weight of the polycaprolactone diol and polyol is described later. When a polycaprolactone diol or a polycaprolactone polyol each having a number average molecular weight of less than 500 is used, the ultimate coating film is poor in elongation at low temperatures. On the other hand, when a polycaprolactone diol or a polycaprolactone polyol each having a number average molecular weight of more than 1500 is used, the resulting urethane prepolymer composition has low NCO content so that the solubility of the composition in a solvent is poor. Also, the prepolymer composition has poor compatibility with component (B) to be employed for producing the polyurethane coating composition system of the present invention. Therefore, the use of such a terminal hydroxyl group-containing polycaprolactone is not practical.

The polycaprolactone to be used in the present invention is a diol having two functional hydroxyl groups or a polyol having at least three functional hydroxyl groups or a mixture thereof. Generally, a polycaprolactone polyol having at least three functional hydroxyl groups is preferred from the viewpoint of obtaining a prepolymer composition having desirable NCO content, solubility in a solvent and compatibility with component (B) to be employed for producing a polyurethane coating composition system.

The polycaprolactone diol and polycaprolactone polyol to be used in the present invention may be prepared by subjecting ε-caprolactone to a ring-opening polymerization in the presence of a catalyst and using, as an initiator, a dihydric or polyhydric alcohol. Examples of catalysts include organic titanium compounds, such as tetrabutyltitanate, tetrapropyltitanate and tetraethyltitanate; tin compounds, such as stannous octate, dibutyltin oxide, dibutyltin dilaurate, tin chloride and tin bromide; and the like. Examples of initiators include dihydric alcohols, such as ethylene glycol, propylene glycol, 1,3-butylene glycol and neopentyl glycol; trihydric alcohols, such as trimethylolpropane and glycerin; and other polyhydric alcohols such as pentaerythritol. From the viewpoint of obtaining prepolymer (b) having a low viscosity, a branched alcohol is preferably used. The ring-opening polymerization of ε-caprolactone is preferably conducted in an atmosphere of nitrogen gas. The molar ratio of ε-caprolactone to an initiator is adjusted so as to obtain a polycaprolactone diol or polyol having a predetermined number average molecular weight. The catalyst is added in an amount of 0.1 to 100 ppm relative to the weight of ε-caprolactone. The ring-opening polymerization is conducted at 150° to 200° C. for 4 to 10 hours. Commercially available polycaprolactones may also be used. Examples of commercially available polycaprolactones include Placcel 303, Placcel 305, Placcel 308, Placcel 312, Placcel 205 and Placcel 212 (tradenames of products manufactured and sold by Daicel Chemical Industries, Ltd., Japan).

In the present invention, the number average molecular weight of each of the polytetramethylene glycol and the terminal hydroxyl group-containing polycaprolactone is determined by measuring the hydroxyl value of each of the glycol and the polycaprolactone in accordance with the method of Japanese Industrial Standards (JIS) K 1577, section 6.4 and calculating from the hydroxyl value according to the following formula:

$$\text{Number average molecular weight} = \frac{A \times N \times 1000}{56.11}$$

wherein A is the hydroxyl value and N is the number of hydroxyl groups present in one molecule of each of the glycol and the polycaprolactone.

In the reactions for preparing prepolymers (a) and (b), the equivalent ratio of NCO groups of the diisocyanate to OH groups of the polytetramethylene glycol, and the equivalent ratio of NCO groups of the diisocyanate to OH groups of the terminal hydroxyl group-containing polycaprolactone, are very important. Each of these equivalent ratios (hereinafter referred to as "NCO/OH") is at least 5/1, preferably at least 8/1. There is no particular limitation with respect to the upper limit of NCO/OH. However, it is preferred that each of the equivalent ratios do not exceed 40/1. When NCO/OH is less than 5/1, consecutive addition reaction between the diisocyanate and the polytetramethylene glycol or the terminal hydroxyl group-containing polycaprolactone is likely to occur so that a prepolymer having an unfavorably high molecular weight is formed. Such a high molecular weight prepolymer would exhibit poor compatibility with a compound having at least two hydroxyl groups to be used as component (B) for preparing a polyurethane coating composition system and would cause the ultimate coating film to have poor elongation. On the other hand, when NCO/OH is greater than 40/1, an unreacted diisocyanate is likely to remain in a large amount in the reaction mixture after completion of the reaction so that the yield of the prepolymer tends to be low. Therefore, it is preferred that NCO/OH be not greater than 40/1 from the viewpoint of productivity of the prepolymer.

The reaction of each of the polytetramethylene glycol and the polycaprolactone having at least two terminal hydroxyl groups with at least one diisocyanate selected from the group consisting of an aliphatic diisocyanate and an alicyclic diisocyanate may be conducted at room temperature to 200° C., preferably 80° to 140° C.

Reaction temperatures lower than room temperature are disadvantageous in that the reaction time is prolonged. On the other hand, when the reaction temperature is higher than 200° C., unfavorable side reactions are likely to occur so that the viscosity of the resultant prepolymer is unfavorably increased and the prepolymer assumes an undesirable color. The reaction may be conducted either in the presence or absence of a solvent. If desired, a solvent not reactive with an isocyanate, such as toluene, xylene, ethyl acetate and butyl acetate, may be used. If desired, in order to promote the reaction of an isocyanate group with a hydroxyl group, a catalyst, such as an organotin compound and a tertiary amine compound, may be used.

After completion of the reaction, volatile components, such as an unreacted diisocyanate and any residual solvent, are removed from the reaction mixture, for example, by a method using a wiped film evaporator or a thin layer evaporator in which a thin layer of the reaction mixture is formed in the evaporator or by a method using a solvent. The unreacted diisocyanate should be removed as completely as possible. Specifically, it is desired that the unreacted diisocyanate content of the prepolymer be not greater than 0.7% by weight, based on the weight of the prepolymer. When the unreacted diisocyanate content exceeds 0.7% by weight, problems of toxicity and irritation due to the unreacted diisocyanate would occur.

The terminal isocyanate group-containing prepolymer (a) above obtained by reacting a polytetramethylene glycol of specific molecular weight with at least one diisocyanate, is mixed with the terminal isocyanate group-containing prepolymer (b) above obtained by reacting at least one polycaprolactone of specific molecular weight having at least two terminal hydroxyl groups with at least one diisocyanate to obtain an urethane prepolymer composition of the present invention. In the urethane prepolymer composition of the present invention, the weight ratio of (a) to (b) is critical, and is required to be in the range of from 20/80 to 80/20. When the weight ratio of (a) to (b) exceeds 80/20, the urethane prepolymer composition has poor compatibility with a compound having at least two hydroxyl groups to be used as component (B) for producing the polyurethane coating composition system of the present invention. Further, when the weight ratio exceeds 80/20, the NCO group content of the urethane prepolymer composition becomes low so that the crosslink density of the ultimate coating film becomes low, thereby leading to a lowering of weathering resistance of the ultimate coating film. On the other hand, when the weight ratio of (a) to (b) is less than 20/80, the above-mentioned low-temperature physical properties of the ultimate coating film are undesirably lowered.

The urethane prepolymer composition of the present invention may be produced by separately preparing prepolymers (a) and (b) and then mixing the two together, as described above. Alternatively, prepolymers (a) and (b) may be prepared simultaneously to obtain an urethane prepolymer composition. That is, the polytetramethylene glycol and the terminal hydroxyl group-containing polycaprolactone are mixed in proportions such that the resultant prepolymer composition has a weight ratio of (a) to (b) of from 20/80 to 80/20, and then the resultant mixture is reacted with at least one diisocyanate to obtain the present prepolymer composition. This reaction may be conducted under substantially the same conditions as described hereinbefore with respect to the individual preparations of prepolymers (a) and (b). The equivalent ratio of NCO groups of the diisocyanate to the total of OH groups of the polytetramethylene glycol and the terminal hydroxyl group-containing polycaprolactone is at least 5/1, preferably at least 8/1. The upper limit of the equivalent ratio is not particularly limited. However, it is preferred that the equivalent ratio do not exceed 40/1.

The polyurethane coating composition system of the present invention comprises (A) the abovedescribed urethane prepolymer composition and (B) at least one compound having at least two hydroxyl groups selected from the group consisting of a diol compound and a polyol compound, wherein the equivalent ratio of the total number of the terminal isocyanate groups of (a) and (b) to the hydroxyl groups of component (B) is in the range of from 0.5/1 to 2.0/1. The hydroxyl group-containing compound to be used as component (B) for preparing the polyurethane coating composition system of the present invention has preferably a number average molecular weight of from 300 to 30,000. The number average molecular weight of the hydroxyl group-containing compound is measured according to the conventional methods, such as a method using gel permeation chromatography (GPC), or the above-mentioned method in which the hydroxy value is measured in accordance with JIS K 1577 6.4. When the number average molecular weight is less than 300, the low-temperature physical properties of the ultimate coating film is unsatisfactory. On the other hand, when the number average molecular weight is greater than 30,000, the hydroxyl group-containing compound has so high a viscosity that the compound has poor compatibility with the urethane prepolymer composition unless a large amount of solvent is used. Moreover, the workability of such a hydroxyl group-containing compound is not preferable because of its high viscosity.

Representative examples of hydroxyl groupcontaining compounds include an acrylic polyol, a polyester diol or polyol, a polycarbonate diol or polyol and a fluorine-containing polyol. Of these hydroxyl group-containing compounds, an acrylic polyol is preferred from the viewpoints of compatibility with the present prepolymer composition and the weathering resistance of the ultimate coating film.

The acrylic polyol to be used in the present invention will be described in more detail hereinbelow.

It is preferred that the acrylic polyol have a glass transition temperature (Tg) of from 30° to 100° C. and a hydroxy value of from 10 to 150 mgKOH/g of the acrylic polyol.

When the glass transition temperature of the acrylic polyol exceeds 100° C., the low-temperature physical properties of the ultimate coating film are lowered. On the other hand, when the glass transition temperature of the acrylic polyol is lower than 30° C., the weathering resistance of the ultimate coating film is unsatisfactory.

The glass transition temperature (Tg) of an acrylic polyol prepared from monomers $\alpha$ and $\beta$, etc. may be calculated from the following formula:

$$Tg(°C.) = \frac{1}{\frac{W_\alpha}{Tg_\alpha + 273} + \frac{W_\beta}{Tg_\beta + 273} + \cdots} - 273$$

wherein $W_\alpha$ and $W_\beta$ respectively represent the quotient of the weight of monomer $\alpha$ in the acrylic polyol divided by the weight of the acrylic polyol and the quotient of the weight of monomer $\beta$ in the acrylic polyol divided by the weight of the acrylic polyol, and wherein $Tg_\alpha$ and $Tg_\beta$ respectively represent the glass transition temperature of a homopolymer of monomer $\alpha$ and the glass transition temperature of a homopolymer of monomer $\beta$. The glass transition temperatures of various homopolymers are available from Polymer Handbook (2nd edition, published by A Wiley Interscience Co.).

When the glass transition temperature of a homopolymer prepared from a monomer contained in the acrylic polyol is not available from the Polymer Handbook, the glass transition temperature of the acrylic polyol can be obtained by the customary dilatometry method [see N. Bekkedahl, J. Res. Nat. Bur. Std. 43, 145(1949) and T. Holleman, Rheol. Acta 10, No. 2, 194(1971)], differential scanning calorimetry (DSC) or the like.

The acrylic polyol has preferably a hydroxy value of from 10 to 150 mgKOH/g of the acrylic polyol. When the hydroxy value is less than 10 mgKOH/g of the acrylic polyol, the crosslink density of the ultimate coating film is low so that the ultimate coating film has not a desired solvent resistance. On the other hand, when the hydroxyl value exceeds 150 mgKOH/g of the acrylic polyol, the low-temperature physical properties of the ultimate coating film are lowered. The hydroxy values used herein are measured in accordance with JIS K 1557 6.4.

The acrylic polyol may be prepared by copolymerization of a (meth)acrylic monomer having at least one hydroxyl group in one molecule with an unsaturated monomer radically copolymerizable therewith [see, for example, Journal of Paint Technology Vol. 43 (562) pages 68-75 (1971), U.S.A.]. Representative examples of such (meth)acrylic monomers include a hydroxyl group-containing acrylate, such as 2-hydroxyethyl acrylate, 2-hydroxypropyl acrylate and 2-hydroxybutyl acrylate; a hydroxyl group-containing methacrylate, such as 2-hydroxyethyl methacrylate, 2-hydroxypropyl methacrylate and 2-hydroxybutyl methacrylate; a (meth)acrylic monoester of glycerin; a (meth)acrylic monoester of trimethylolpropane; and mixtures thereof. Representative examples of such copolymerizable monomers include acrylates, such as methyl acrylate, ethyl acrylate, isopropyl acrylate, n-butyl acrylate and 2-ethylhexyl acrylate; methacrylates, such as methyl methacrylate, ethyl methacrylate, isopropyl methacrylate, n-butyl methacrylate, isobutyl methacrylate, n-hexyl methacrylate, lauryl methacrylate or glycidyl methacrylate; and mixtures of the above-mentioned (meth)acrylates. The above-mentioned copolymerization may be performed in the presence or absence of an optional monomer selected from the group consisting of an unsaturated carboxylic acid, such as acrylic acid, methacrylic acid, maleic acid or itaconic acid; an unsaturated amide, such as acrylamide, N-methylolacrylamide or diacetone acrylamide; styrene; vinyltoluene; vinyl acetate; and acrylonitrile.

The copolymerization of the hydroxyl group-containing (meth)acrylic monomer with the unsaturated monomer radically copolymerizable therewith can be conducted according to the conventional polymerization method, such as a solution polymerization method. Solution polymerization of the hydroxyl group-containing (meth)acrylic monomer, the unsaturated monomer radically copolymerizable therewith and, if desired, the optional monomer may be preformed in a solvent, such as toluene, xylene, ethyl acetate or butyl acetate in the presence of a polymerization catalyst at a temperature of from 40° to 170° C. for a period of from 4 to 10 hours.

As a polymerization catalyst, there may be employed a customary radical polymerization initiator, for example, an azo compound, a peroxide, a diazo compound, a redox catalyst or the like.

Commercially available acrylic polyols may be used in the present invention. Representative examples of commercially available acrylic polyols include ACLYDIC A801, ACLYDIC A807 (both, tradenames of products manufactured and sold by Dainippon Ink & Chemicals, Inc., Japan), HITALOID 3008, HITALOID 3083 (both, tradenames of products manufactured and sold by Hitachi Chemical Co., Ltd., Japan), COATAX LH-601, and COATAX LH-657 (both, tradenames of products manufactured and sold by Toray Industries Inc., Japan).

Examples of polyester diols or polyols to be employed as component (B) in the present invention include those obtained by a condensation reaction of at least one dibasic carboxylic acid selected from the group consisting of succinic acid, adipic acid, sebacic acid, dimer acid, maleic anhydride, phthalic anhydride, isophthalic acid and terephthalic acid, with at least one dihydric or polyhydric alcohol selected from the group consisting of ethylene glycol, propylene glycol, diethylene glycol, butylene glycol, neopentyl glycol trimethylolpropane and glycerin; and polycaprolactone diols or polyols obtained by a ring opening polymerization of ε-caprolactone using a dihydric or polyhydric alcohol.

Commercially available polyester diols or polyols are also employable as component (B) in the present invention. Examples of such diols or polyols include BURNOCK D6-439 and BURNOCK D-220 (both, tradenames of products produced and sold by Dainippon Ink & Chemicals, Inc., Japan).

Examples of polycarbonate diols or polyols to be employed as component (B) in the present invention include those obtained by a customary polymerization method using, as a raw material, an aromatic dihydric alcohol, such as bisphenol A, and an aliphatic or alicyclic dihydric alcohol, e.g., 1,6-hexanediol.

Examples of fluorine-containing polyols to be employed as component (B) in the present invention include those obtained by a polymerization of a fluoroolefin, as described in Japanese Patent Application Laid-Open Specification Nos. 57-34107 (corresponding to U.S. Pat. No. 4,345,057), 57-34108 (corresponding to U.S. Pat. No. 4,345,057) and 61-176620 (corresponding to U.S. Pat. No. 4,667,000); those obtained by modifying the abovementioned fluorine-containing polyols, as described in Japanese Patent Application Laid-Open Specification Nos. 59-41321, 59-96177 and 61-118466; and those obtained by a polymerization of an unsaturated monomer having pendant fluorine-containing groups, as described in Japanese Patent Application Laid-Open Specification No. 58-34866.

Commercially available fluorine-containing polyols are also employable as component (B) in the present invention. Examples of such polyols include LUMIFLON LF-100 and LUMIFLON LF-200 (both, tradenames of products produced and sold by Asahi Glass Co., Ltd., Japan); and K-700 and K-701 (both, tradenames of products produced and sold by Dainippon Ink & Chemicals, Inc., Japan)

In the polyurethane coating composition system of the present invention, the above-described urethane prepolymer composition and the above-described hydroxyl group-containing compound are separately provided and are adapted to being mixed when used. In the coating composition system, the equivalent ratio of the total number of the terminal isocyanate groups of (a) and (b) to the hydroxyl groups of component (B) is in the range of from 0.5/1 to 2.0/1. If the value of the equivalent weight ratio is less than 0.5/1, the solvent resistance and weathering resistance of the ultimate coating film are poor. On the other hand, if the value exceeds 2.0/1, i.e., isocyanate groups being present in excess, the physical properties of the ultimate coating film at low temperatures are poor.

With respect to the polyurethane coating composition system of the present invention, the curing after application to a resin substrate, such as a polyurethane bumper and a facing material for buildings, is performed either at room temperature or at an elevated temperature. In the case of the latter, it is preferred that the curing temperature do not exceed 200° C.

The polyurethane coating composition system of the present invention per se may be used as a clear coating or an adhesive. Alternatively, a solvent or an additive may be added to the coating composition system of the present invention. Representative examples of solvents are ethyl acetate, butyl acetate, toluene, xylene, methyl ethyl ketone, methyl isobutyl ketone and cellosolve acetate. Representative examples of additives are customary color pigments, extender pigments, dispersants, anti-foaming agents, leveling agents and thixotropy agents. Further, for facilitating curing, a catalyst, such as an organotin compound and a tertiary amine compound may be added to the present coating composition system.

Still further, for prevention of photo-deterioration and oxidative degradation of the ultimate coating film, a stabilizer, such as a hindered phenol-type stabilizer, benzotriazole-type stabilizer and a hindered amine-type stabilizer may be added to the polyurethane coating composition system of the present invention. Examples of hindered phenol-type stabilizers include pentaerythrityl-tetrakis[3-(3,5-di-tertiarybutyl-4-hydroxyphenyl) propionate]; 2,2'-thiodiethylbis-[3-(3,5-di-tertiarybutyl-4-hydroxyphenyl)propionate]; octadecyl-3-(3,5-di-tertiarybutyl-4-hydroxyphenyl) propionate; and 1,3,5-tris(4-tertiarybutyl-3-hydroxy-2,6-dimethyl) isocyanurate. Examples of benzotriazole-type stabilizers include 2-(2-hydroxy-5-methylphenyl)-2H-benzotriazole; 2-(2-hydroxy-3,5-di-tertiarybutylphenyl)-2H-benzotriazole; and 2-(2-hydroxy-3,5-di-tertiaryamylphenyl)-2H-benzotriazole. Examples of hindered amine-type stabilizers include bis(1,2,2,6,6-pentamethyl-4-piperidyl)sebacate; bis(2,2,6,6-tetramethyl-4-piperidyl)sebacate; and 4-benzoyloxy-2,2,6,6-tetramethylpiperidine. These stabilizers may be used individually or in combination. When these stabilizers are employed in combination, a combination of a hindered amine with a hindered phenol or a benzotriazole is preferred. The amount of stabilizer to be added is in the range of generally from 100 ppm to 20,000 ppm, preferably 500 ppm to 5,000 ppm, based on the weight of the urethane prepolymer composition.

By using the polyurethane coating composition system of the present invention, a coating film which is excellent in transparency, elastic recovery, weathering resistance, and low-temperature physical properties, particularly mechanical strength, flexibility and impact resistance at low temperatures, e.g., −30° C., can be obtained. Therefore, an especially advantageous application of the present polyurethane coating composition system is found in a coating for a resin product, such as an automobile bumper and a facing material for buildings. Further, advantageous application of the present polyurethane coating composition system is found in coating for parts for which improved resistance to chipping is desired.

The coating film formed from the present polyurethane coating composition system is excellent in both low-temperature physical properties and weathering resistance. In the coating films formed from the conventional polyurethane coating composition systems, excellent low-temperature physical properties and excellent weathering resistance are contradictory to each other. This is because if low-temperature physical properties are to be improved in a conventional coating film, the cross-link density of the coating film has to be lowered and/or the glass transition temperature (Tg) of the coating film has to be lowered (for example in the base of an acrylic polyol type polyurethane coating composition system, Tg can be lowered by employing an acrylic polyol prepared from monomers having low Tg). However, the lowering of the crosslink density and/or Tg inevitably causes the weathering resistance of the ultimate coating film to become poor. However, by the use of the present polyurethane coating composition system, a coating film excellent in both low-temperature physical properties and weathering resistance is obtained. This is believed to be due to the specific combination of (A) a urethane prepolymer composition comprising two different types of specific terminal isocyanate group-containing urethane prepolymers (a) and (b) with (B) at least one compound having at least two hydroxyl groups selected from the group consisting of a diol compound and a polyol compound.

As mentioned hereinbefore, it was proposed to add a polycaprolactone diol or polyol as an additive to the so-called two-pack polyurethane coating composition system which is suited for use in coating a steel plate body for an automobile but poor in elastic properties of the coating derived from the composition system, so as to provide a coating composition system capable of forming a coating having improved elastic properties so that it can advantageously be used for coating a resin product, such as a polyurethane bumper. However, as also mentioned hereinbefore, this proposal has problems in controlling the NCO/OH ratio in the coating composition system and providing a coating excellent in both of elastic properties and weathering resistance. By contrast, in the present invention, a urethane prepolymer composition comprising a prepolymer derived from a polytetramethylene glycol having a specific molecular weight and a prepolymer derived from a terminal hydroxyl group-containing polycaprolactone is used and any additional diol or polyol as employed in the prior art is not used. By the use of such a specific prepolymer composition according to the present invention, a coating film having excellent weathering resistance, elastic recovery, transparency and low-temperature physical properties can be provided on a bumper and other resin automobile parts, and the problem of difficult controlling of the NCO/OH ratio in the coating composition system can be avoided. Moreover, an acrylic polyol is advantageously used, as a component to be reacted with an isocyanate group, in the coating of a steel plate body for an automobile. An acrylic polyol is also advantageously used in the present polyurethane coating composition system for a bumper and other resin automobile parts. The use of the same polyol in the coating of the steel plate and in the coating of the resin parts is extremely advantageous from the viewpoint of productivity.

With respect to the coating film formed from the polyurethane coating composition system of the present invention, analysis of the components can be performed, for example, by a method in which the coating film is subjected to acid decomposition or alkali decomposition and the resultant decomposition products, such as diamine, 1,4-butylene glycol and $OH(CH_2)_5COOH$, are identified by functional group analysis; or a method in which the coating film is subjected to pyrolytic gas chromatography for the analysis of component monomers.

The present invention will now be described in more detail with reference to Reference Examples, Examples and Comparative Examples which should not be construed as limiting the scope of the present invention.

In the following Reference Examples, Examples and Comparative Examples, various properties are measured as follows:

(1) NCO content (% by weight) of a prepolymer or a prepolymer composition is measured by titration in accordance with JIS-K-1556.

(2) Compatibility of a prepolymer or a prepolymer composition with an acrylic polyol is assessed by visual inspection.

(3) Elongation at break and tensile strength at break are measured in accordance with JIS K 6031 at −30° C.

(4) Flexibility is tested in accordance with JIS K 5400 6.16 at −30° C., using a ½-inch mandrel with respect to a coating film formed on a commercially available polyurethane bumper having a thickness of 3 mm.

(5) Impact resistance is tested by a Du Pont impact tester (½ inch×500 g×500 mm) in accordance with JIS K5400 6.13.3 at −30° C. with respect to a coating film formed on a commercially available polyurethane bumper having a thickness of 3 mm.

(6) Retention of gloss and yellowing degree are measured by a QUV accelerated weathering test in accordance with ASTM G-53-77, in which UV exposure at 60° C. for 4 hours and condensation exposure at 40° C. for 4 hours are alternatively repeated for 2,000 hours. Gloss and yellowing degree are measured in accordance with JIS-Z-8741 and JIS-K-7103, respectively.

Reference Example 1 (synthesis of a urethane prepolymer from a polytetramethylene glycol)

Charged into a 2 l-flask provided with a thermometer, a cooling apparatus and an agitator are 1,008 g of 1,6-hexamethylene diisocyanate (HMDI) and 400 g of a polytetramethylene glycol having a number average molecular weight of 1,000 (PTG 1000: tradename of product produced and sold by Hodogaya Chemical Co., Ltd., Japan), and reaction is performed at 100° C. for 1 hour while stirring. The resultant reaction mixture is subjected to distillation at 160° C. under a vacuum of 0.2 mmHg by a wiped film evaporator to remove unreacted HMDI, thereby obtaining, as a bottom product, 525 g of a prepolymer having an NCO content of 6.2% by weight. The prepolymer contains unreacted HMDI in an amount of 0.1% by weight as measured by gas chromatography. Reference Examples 2 to 10 (synthesis of various urethane prepolymers)

Substantially the same procedure as in Synthetic Example 1 is repeated except that the type of the polyol and the amount of HMDI to be charged are changed to those as indicated in Table 1. The details of the resultant prepolymers are shown in Table 1.

obtaining, as a bottom product, 665 g of a prepolymer having an NCO content of 8.9% by weight. The prepolymer contains unreacted HMDI in an amount of 0.2% by weight as measured by gas chromatography.

Reference Example 13 (synthesis of a urethane prepolymer from a polycaprolactone polyol)

TABLE 1

| Trade Name | Reference Example 1 PTG 1000 | Reference Example 2 PTG 650 | Reference Example 3 PTG 1500 | Reference Example 4 PTG 1800 | Reference Example 5 Placcel 303 | Reference Example 6 Placcel 305 | Reference Example 7 Placcel 308 | Reference Example 8 Placcel 312 | Reference Example 9 Placcel 205 | Reference Example 10 Placcel 212 |
|---|---|---|---|---|---|---|---|---|---|---|
| Polyol | | | | | | | | | | |
| Number average molecular weight | 1000 | 650 | 1500 | 1800 | 350 | 550 | 850 | 1250 | 550 | 1250 |
| Number of functional groups | 2 | 2 | 2 | 2 | 3 | 3 | 3 | 3 | 2 | 2 |
| Amount charged | | | | | | | | | | |
| HMDI (g) | 1008 | 1260 | 756 | 630 | 945 | 945 | 945 | 756 | 1260 | 630 |
| Polyol (g) | 400 | 325 | 450 | 450 | 88 | 138 | 213 | 250 | 275 | 313 |
| NCO/OH (equivalent ratio) | 15 | 15 | 15 | 15 | 15 | 15 | 15 | 15 | 15 | 15 |
| Synthesis conditions | | | | | | | | | | |
| Reaction temperature (°C.) | 100 | 100 | 100 | 100 | 100 | 100 | 100 | 100 | 100 | 100 |
| Reaction time (Hr) | 1 | 1 | 1 | 1 | 1 | 1 | 1 | 1 | 1 | 1 |
| Distillation temperature (°C.) | 160 | 160 | 160 | 160 | 160 | 160 | 160 | 160 | 160 | 160 |
| Distillation pressure (mm Hg) | 0.2 | 0.2 | 0.2 | 0.2 | 0.2 | 0.2 | 0.2 | 0.2 | 0.2 | 0.2 |
| Prepolymer | | | | | | | | | | |
| NCO % | 6.2 | 8.5 | 4.4 | 3.9 | 14.7 | 11.9 | 9.4 | 7.1 | 9.4 | 5.3 |
| HMDI content % | 0.1 | 0.1 | 0.2 | 0.1 | 0.1 | 0.1 | 0.1 | 0.1 | 0.1 | 0.1 |
| Yield (g) | 525 | 470 | 539 | 530 | 202 | 241 | 329 | 337 | 425 | 381 |

Reference Example 11 (synthesis of a urethane prepolymer from a polytetramethylene glycol and a polycaprolactone polyol)

Substantially the same procedure as in Reference Example 1 is repeated except that 630 g of HMDI, 100 g of PTG1000 and 85 g of a polycaprolactone polyol having a number average molecular weight of 850 (Placcel 308: tradename of a product manufactured and sold by Daicel Chemical Industries, Ltd., Japan) are employed. As a result, there is obtained 255 g of a prepolymer having an NCO content of 7.7% by weight. The prepolymer contains unreacted HMDI in an amount of 0.1% by weight as measured by gas chromatography.

Reference Example 12 (synthesis of a urethane prepolymer from a polycaprolactone polyol)

Charged into a 2 l-flask provided with a thermometer, a cooling apparatus and an agitator are 756 g of HMDI and 425 g of Placcel 308 so that the equivalent ratio NCO/OH of the resultant mixture is 6.0, and reaction is performed at 100° C. for 1 hour while stirring. The resultant reaction mixture is subjected to distillation at 160° C. under a vacuum of 0.2 mmHg by a wiped film evaporator to remove unreacted HMDI, thereby Charged into a 2 l-flask provided with a thermometer, a cooling apparatus and an agitator are 666 g of isophorone diisocyanate (IPDI) and 100 g of a polycaprolactone polyol having a number average molecular weight of 550 (Placcel 305: tradename of a product produced and sold by Daicel Chemical Industries, Ltd., Japan), and reaction is performed at 120° C. for 2 hours while stirring. The resultant reaction mixture is subjected to distillation at 180° C. under a vacuum of 0.2 mmHg by a wiped film evaporator to remove unreacted IPDI, thereby obtaining, as a bottom product, 200 g of a prepolymer having an NCO content of 10.1% by weight. The prepolymer contains unreacted IPDI in an amount of 0.5% by weight as measured by gas chromatography.

Reference Example 14 (synthesis of a urethane prepolymer from a polytetramethylene glycol and a polycaprolactone polyol)

Charged into a 2 l-flask provided with a thermometer, a cooling apparatus and an agitator are 630 g of HMDI, 100 g of PTG 1000 and 55 g of Placcel 305 so that the equivalent ratio NCO/OH of the resultant mixture is 15, and reaction is performed at 100° C. for 1 hour while stirring. The resultant reaction mixture is subjected to distillation at 160° C. under a vacuum of 0.2 mmHg by a wiped film evaporator to remove unreacted HMDI, thereby obtaining, as a bottom product, 225 g of a prepolymer having an NCO content of 8.9% by weight and a viscosity of 2500 mPa.s as measured at 25° C. by a rotational viscometer in accordance with JIS K-6833. The prepolymer contains unreacted HMDI in an amount of 0.1% by weight as measured by gas chromatography.

Reference Example 15 (synthesis of a urethane prepolymer from a polytetramethylene glycol and a polycaprolactone polyol)

Charged into a 2 l-flask provided with a thermometer, a cooling apparatus and an agitator are 630 g of HMDI, 150 g of PTG 1000 and 83 g of Placcel 305 so that the equivalent ratio NCO/OH of the resultant mixture is 10, and reaction is performed at 100° C. for 1 hour while stirring. The resultant reaction mixture is subjected to distillation at 160° C. under a vacuum of 0.2 mmHg by a wiped film evaporator to remove unreacted HMDI, thereby obtaining, as a bottom product, 340 g of a prepolymer having an NCO content of 8.7% by weight and a viscosity of 2650 mPa.s as measured at 25° C. by a rotational viscometer in accordance with JIS K-6833. The prepolymer contains unreacted HMDI in an amount of 0.1% by weight as measured by gas chromatography.

Reference Example 16 (synthesis of a urethane prepolymer from a polytetramethylene glycol and a polycaprolactone polyol)

Charged into a 2 l-flask provided with a thermometer, a cooling apparatus and an agitator are 630 g of HMDI, 300 g of PTG 1000 and 165 g of Placcel 305 so that the equivalent ratio NCO/OH of the resultant mixture is 5, and reaction is performed at 100° C. for 1 hour while stirring. The resultant reaction mixture is subjected to distillation at 160° C. under a vacuum of 0.2 mmHg by a wiped film evaporator to remove unreacted HMDI, thereby obtaining, as a bottom product, 695 g of a prepolymer having an NCO content of 7.5% by weight and a viscosity of 4700 mPa.s as measured at 25° C. by a rotational viscometer in accordance with JIS K-6833. The prepolymer contains unreacted HMDI in an amount of 0.2% by weight as measured by gas chromatography.

From the above Reference Examples, it is apparent that the larger the equivalent ratio NCO/OH of the starting mixture, the lower the viscosity of the final prepolymer composition.

Example 1

6.0 Parts by weight of the prepolymer obtained in Reference Example 1 is mixed with 6.0 parts by weight of the prepolymer obtained in Reference Example 7, thereby obtaining a prepolymer composition. The prepolymer composition is mixed with 25 parts by weight of ACLYDIC A 801 (tradename of an acrylic polyol manufactured and sold by DAINIPPON INK & CHEMICALS, INC., Japan, hydroxyl value: 50 mg KOH/g, Tg: 70° C.), thereby obtaining a coating composition system. The viscosity of the resultant coating composition system is adjusted to a value of 15 seconds of Ford viscosity cup No. 4 with toluene. The thus obtained coating solution is not turbid, exhibiting good compatibility with the polyol. The coating solution is applied to a substrate by spraying, and dried at 20° C. under 60% relative humidiy for 7 days, thereby obtaining a coating film on the substrate. The coating film is transparent and has excellent flexibility.

The above-obtained coating film is subjected to measurements of mechanical properties. As a result, it is found that the coating film has an elongation at break of 100% and a tensile strength at break of 136 kg/cm² each at −30° C.

Further, the coating solution is applied to a commercially available polyurethane bumper having a thickness of 3 mm to obtain a 50 μ-thick coating. The resultant coating is dried in the same conditions as mentioned above, thereby obtaining a dried coating film. The coating film is subjected to flexibility and impact resistance testings at −30° C., but undergoes no cracking at all.

Further, the QUV accelerated weathering test is conducted according to the procedure described hereinbefore. As a result, it is found that the coating film has a retention of gloss of 95% and a yellowing degree of 19 after 2,000 hours, showing excellent weathering resistance.

EXAMPLES 2 to 9 AND COMPARATIVE EXAMPLES 1 TO 5

The prepolymers obtained in Reference Examples 1 to 11 are used individually or in combination to prepare a urethane prepolymer composition, and mixed with ACLYDIC A 801 in the amounts indicated in Table 2 to thereby obtain polyurethane coating composition systems. These resultant polyurethane coating composition systems are subjected to measurements of various properties according to the procedures as described hereinbefore. The results are shown in Table 3.

The polyurethane coating composition systems of the present invention gives a coating film having excellent properties, in particular, excellent weathering resistance, transparency and low-temperature physical properties such as mechanical strength, flexibility and impact resistance at low temperatures.

TABLE 2

| Example and Comparative Example | | 1 | 2 | 3 | 4 | 5 | 6 | 7 | 8 | 9 |
|---|---|---|---|---|---|---|---|---|---|---|
| PTMG Prepolymer (A) | corresponding Synthetic Example | 1 | 3 | 1 | 1 | 1 | 1 | 1 | 1 | 11 |
| | parts by weight | 6.0 | 6.8 | 5.2 | 7.0 | 6.0 | 8.1 | 9.1 | 4.1 | 6.1 |
| Polycaprolactone Prepolymer (B) | corresponding Synthetic Example | 7 | 7 | 6 | 8 | 9 | 10 | 7 | 8 | 11 |
| | parts by weight | 6.0 | 6.8 | 5.2 | 7.0 | 6.0 | 8.1 | 3.9 | 9.6 | 6.1 |
| Mixture/ratio | (A)/(B) | 50/50 | 50/50 | 50/50 | 50/50 | 50/50 | 50/50 | 70/30 | 30/70 | 50/50* |

TABLE 2-continued

| | | | | | | | | | | |
|---|---|---|---|---|---|---|---|---|---|---|
| Acryl/Polyol** | parts by weight | 25.0 | 25.0 | 25.0 | 25.0 | 25.0 | 25.0 | 25.0 | 25.0 | 25.0 |
| NCO/OH | equivalent ratio | 1.0 | 1.0 | 1.0 | 1.0 | 1.0 | 1.0 | 1.0 | 1.0 | 1.0 |

| | | Example and Comparative Example | Comparative Example | | | | |
|---|---|---|---|---|---|---|---|
| | | | 1 | 2 | 3 | 4 | 5 |
| PTMG Prepolymer (A) | corresponding Synthetic Example | | 1 | — | 2 | 1 | 4 |
| | parts by weight | | 15.1 | — | 5.2 | 4.5 | 7.0 |
| Poly-caprolactone Prepolymer (B) | corresponding Synthetic Example | | — | 6 | 7 | 5 | 7 |
| | parts by weight | | — | 7.9 | 5.2 | 4.5 | 7.0 |
| Mixture/ratio | (A)/(B) | | 100/0 | 0/100 | 50/50 | 50/50 | 50/50 |
| Acryl/Polyol** | parts by weight | | 25.0 | 25.0 | 25.0 | 25.0 | 25.0 |
| | NCO/OH equivalent ratio | | 1.0 | 1.0 | 1.0 | 1.0 | 1.0 |

*Value of (A)/(B) is determined on mixing ratio of polyols when the reaction is conducted.
**ACLYDIC A801 (manufactured and sold by DAINIPPON INK & CHEMICALS, INC., Japan)

TABLE 3

| Example and Comparative Example | Example | | | | | | | | |
|---|---|---|---|---|---|---|---|---|---|
| | 1 | 2 | 3 | 4 | 5 | 6 | 7 | 8 | 9 |
| Compatibility with acrylic polyol | good | good | good | good | good | good | good | good | good |
| Appearance of coating film | transparent | transparent | transparent | transparent | transparent | transparent | transparent | transparent | transparent |
| Elongation at break % | 100 | 132 | 84 | 145 | 156 | 168 | 131 | 43 | 106 |
| Tensile strength at break kg/cm$^2$ | 136 | 110 | 250 | 125 | 134 | 105 | 110 | 230 | 160 |
| Flexibility | O | O | O | O | O | O | O | O | O |
| Impact resistance | O | O | O | O | O | O | O | O | O |
| Retention of gloss % | 95 | 85 | 96 | 90 | 92 | 89 | 82 | 90 | 95 |

| | Example and Comparative Example | Comparative Example | | | | |
|---|---|---|---|---|---|---|
| | | 1 | 2 | 3 | 4 | 5 |
| | Compatibility with acrylic polyol | slightly white turbid | good | good | good | slightly white turbid |
| | Appearance of coating film | slightly white turbid | transparent | transparent | transparent | slightly white turbid |
| | Elongation at break % | 120 | 6 | 22 | 8 | 150 |
| | Tensile strength at break kg/cm$^2$ | 142 | 369 | 254 | 370 | 44 |
| | Flexibility | O | Δ | Δ | X | O |
| | Impact resistance | O | Δ | O | X | O |
| | Retention of gloss % | 70 | 98 | 95 | 95 | 75 |

Note
O: no crack
Δ: slightly cracked
X: cracked

EXAMPLE 10

4.2 Parts by weight of the prepolymer obtained in Reference Example 1 is mixed with 4.2 parts by weight of the prepolymer obtained in Reference Example 6, thereby obtaining a prepolymer composition. The prepolymer composition is mixed with 25 parts by weight of ACLYDIC A 804 (tradename of an acrylic polyol manufactured and sold by DAINIPPON INK & CHEMICALS, INC., Japan, hydroxyl value: 40 mg KOH/g, Tg: 52° C.), thereby obtaining a coating composition system. The viscosity of the resultant coating composition system is adjusted to a value of 15 seconds of Ford viscosity cup No. 4 with toluene. The thus obtained coating solution is not turbid, exhibiting good compatibility with the polyol. The coating solution is applied to a substrate by spraying, and dried at 20° C. under 60% relative humidity for 7 days, thereby obtaining a coating film on the substrate. The dried coating film is transparent and has excellent flexibility.

The above-obtained coating film is subjected to measurements of mechanical properties. As a result, it is found that the coating film has an elongation at break of 125% and a tensile strength at break of 230 kg/cm$^2$ each at −30° C.

Further, the coating solution is applied to a commercially available polyurethane bumper having a thickness of 3 mm to obtain a 50 μ-thick coating. Then, the resultant coating is dried in the same conditions as mentioned above, thereby obtaining a dried coating film. The coating film is subjected to flexibility and impact resistance testings at −30° C., but undergoes no cracking at all.

Further, the QUV accelerated weathering test of the coating film is conducted according to the procedure described hereinbefore. As a result, it is found that the coating film has a retention of gloss of 90% and a yellowing degree of 20 after 2,000 hours, showing excellent weathering resistance.

EXAMPLE 11

2.7 Parts by weight of the prepolymer obtained in Reference Example 1 is mixed with 2.7 parts by weight of the prepolymer obtained in Reference Example 6, thereby obtaining a prepolymer composition. The prepolymer composition is mixed with 25 parts by weight of BURNOCK DE-140-70 (tradename of a polyester polyol manufactured and sold by DAINIPPON INK & CHEMICALS, INC., Japan, hydroxyl value: 95 mg KOH/g), thereby obtaining a coating composition system. The viscosity of the resultant coating composition system is adjusted to a value of 15 seconds of Ford viscosity cup No. 4 with toluene. The thus obtained coating solution is not turbid, exhibiting good compatibility with the polyol. The coating solution is applied to a substrate by spraying, and dried at 20° C. under 60% relative humidity for 7 days, thereby obtaining a coating film on the substrate. The coating film is transparent and has excellent flexibility.

The above-obtained coating film is subjected to measurements of mechanical properties. As a result, it is found that the coating film has an elongation at break of 90% and a tensile strength at break of 235 kg/cm² each at −30° C.

Further, the coating solution is applied to a commercially available polyurethane bumper having a thickness of 3 mm to obtain a 50 μ-thick coating. The resultant coating is dried in the same conditions as mentioned above, thereby obtaining a dried coating film. The coating film is subjected to flexibility and impact resistance testings at −30° C., but undergoes no cracking at all.

Further, the QUV accelerated weathering test of the coating film is conducted according to the procedure described hereinbefore. As a result, it is found that the coating film has a retention of gloss of 87% and a yellowing degree of 25 after 2,000 hours, showing excellent weathering resistance.

EXAMPLE 12

Substantially the same procedure as in Example 1 is repeated except that 2000 ppm of 1,3,5-tris(4-tertiarybutyl-3-hydroxy 2,6-dimethyl) isocyanuric acid of hindered phenol series and 2,000 ppm of bis(1,2,2,6,6-pentamethylene-4-piperidine)sebacate of hindered amine series as a stabilizer are added to a mixture of 6.0 parts by weight of the prepolymer obtained in Reference Example 1 and 6.0 parts by weight of the prepolymer obtained in Reference Example 7. The obtained coating film is transparent and has excellent flexibility.

The above-obtained coating film is subjected to measurements of mechanical properties. As a result, it is found that the coating film has an elongation at break of 105% and a tensile strength at break of 154 kg/cm² each at −30° C.

Further, the coating solution is applied to a commercially available polyurethane bumper having a thickness of 3 mm to obtain a 50 μ-thick coating. The resultant coating is dried in the same conditions as mentioned above, thereby obtaining a dried coating film. The coating film is subjected to flexibility and impact resistance testings at −30° C., but undergoes no cracking at all.

Further, the QUV accelerated weathering test of the coating film is conducted according to the procedure described hereinbefore. As a result, it is found that the coating film has a retention of gloss of 96% and a yellowing degree of 13 after 2,000 hours, showing excellent weathering resistance.

This shows that the coating film containing the stabilizer is extremely excellent in preventing yellowing as compared to the coating film not containing the stabilizer as in Example 1.

EXAMPLE 13

Substantially the same procedure as in Example 1 is repeated except that a mixture of 6.2 parts by weight of the prepolymer obtained in Reference Example 1 and 6.2 parts by weight of the prepolymer obtained in Reference Example 12 is used. The obtained coating film is transparent and has excellent flexibility.

The above-obtained coating film is subjected to measurements of mechanical properties. As a result, it is found that the coating film has an elongation at break of 90% and a tensile strength at break of 163 kg cm² each at −30° C.

Further, the coating solution is applied to a commercially available polyurethane bumper having a thickness of 3 mm to obtain a 50 μ-thick coating. The resultant coating is dried in the same conditions as mentioned above, thereby obtaining a dried coating film. The coating film is subjected to flexibility and impact resistance testings at −30° C., but undergoes no cracking at all.

Further, the QUV accelerated weathering test of the coating film is conducted according to the procedure described hereinbefore. As a result, it is found that the coating film has a retention of gloss of 95% and a yellowing degree of 18 after 2,000 hours, showing excellent weathering resistance.

EXAMPLE 14

Substantially the same procedure as in Example 1 is repeated except that a mixture of 6.5 parts by weight of the prepolymer obtained in Reference Example 3 and 6.5 parts by weight of the prepolymer obtained in Reference Example 13 is used. The obtained coating film is transparent and has excellent flexibility.

The above-obtained coating film is subjected to measurements of mechanical properties. As a result, it is found that the coating film has an elongation at break of 45% and a tensile strength at break of 210 kg/cm² each at −30° C.

Further, the coating solution is applied to a commercially available polyurethane bumper having a thickness of 3 mm to obtain a 50 μ-thick coating. The resultant coating is dried in the same conditions as mentioned above, thereby obtaining a dried coating film. The coating film is subjected to flexibility and impact resistance testings at −30° C., but undergoes no cracking at all.

Further, the QUV accelerated weathering test of the coating film is conducted according to the procedure described hereinbefore. As a result, it is found that the coating film has a retention of gloss of 90% and a yellowing degree of 22 after 2,000 hours, showing excellent weathering resistance.

What is claimed is:
1. A urethane prepolymer composition comprising:
   (a) a terminal isocyanate group-containing urethane prepolymer obtained by reacting a polytetramethylene glycol having a number average molecular weight of from 700 to 1500 with at least one diisocyanate selected from the group consisting of an aliphatic diisocyanate and an alicyclic diisocyanate at an equivalent ratio of the isocyanate groups of said diisocyanate to the hydroxyl groups of said glycol of at least 5/1, and (b) a terminal isocyanate group-containing urethane prepolymer obtained by reacting at least one polycaprolactone having at least two terminal hydroxyl groups, said polycaprolactone being selected from the group consisting of a polycaprolactone diol and a polycaprolactone polyol each having a number average molecular weight of from 500 to 1500, with at least one diisocyanate selected from the group consisting of an aliphatic diisocyanate and an alicyclic diisocyanate at an equivalent ratio of the isocyanate groups of said diisocyanate to the hydroxyl groups of said polycaprolactone of at least 5/1, the weight ratio of (a) to (b) being in the range of from 80/20 to 20/80.

2. The urethane prepolymer composition according to claim 1, wherein said polycaprolactone is a poly-ε-caprolactone.

3. The urethane prepolymer composition according to claim 1, wherein the aliphatic and alicyclic diisocyanates of (a) and (b), respectively, have 4 to 30 and 8 to 30 carbon atoms.

4. The urethane prepolymer composition according to claim 3, wherein the diisocyanates of (a) and (b) are each selected from the group consisting of 1,4-tetramethylene diisocyanate, 1,5-pentamethylene diisocyanate, 1,6-hexamethylene diisocyanate, 2,2,4-trimethyl-1,6-hexamethylene diisocyanate, lysine diisocyanate, isophorone diisocyanate, 1,3-bis(isocyanatomethyl)cyclohexane and 4,4'-dicyclohexylmethane diisocyanate.

5. The urethane prepolymer composition according to claim 4, wherein the diisocyanates of (a) and (b) are each 1,6-hexamethylene diisocyanate.

6. The urethane prepolymer composition according to claim 1, wherein the equivalent ratio of the isocyanate groups of said diisocyanate to the hydroxyl groups of said glycol of (a) and the equivalent ratio of the isocyanate groups of said diisocyanate to the hydroxyl groups of said polycaprolactone of (b) are each at least 8/1.

7. A polyurethane coating composition system comprising components (A) and (B), in which said components are separately provided and are adapted to being mixed when used, wherein said components are defined as follows:

(A) a urethane prepolymer composition comprising:
(a) a terminal isocyanate group-containing urethane prepolymer obtained by reacting a polytetramethylene glycol having a number average molecular weight of from 700 to 1500 with at least one diisocyanate selected from the group consisting of an aliphatic diisocyanate and an alicyclic diisocyanate at an equivalent ratio of the isocyanate groups of said diisocyanate to the hydroxyl groups of said glycol of at least 5/1, and (b) a terminal isocyanate group-containing urethane prepolymer obtained by reacting at least one polycaprolactone having at least two terminal hydroxyl groups, said polycaprolactone being selected from the group consisting of a polycaprolactone diol and a polycaprolactone polyol each having a number average molecular weight of from 500 to 1500, with at least one diisocyanate selected from the group consisting of an aliphatic diisocyanate and an alicyclic diisocyanate at an equivalent ratio of the isocyanate groups of said diisocyanate to the hydroxyl groups of said polycaprolactone of at least 5/1, the weight ratio of (a) to (b) being in the range of from 80/20 to 20/80; and (B) at least one compound having at least two hydroxyl groups, said compound being selected from the group consisting of a diol compound and a polyol compound, wherein the equivalent ratio of the total number of the terminal isocyanate groups of (a) and (b) to the hydroxyl groups of component (B) is in the range of from 0.5/1 to 2.0/1.

8. The polyurethane coating composition system according to claim 7, wherein the compound having at least two hydroxyl groups of component (B) has a number average molecular weight of from 300 to 30,000.

9. The polyurethane coating composition system according to claim 8, wherein the compound having at least two hydroxyl groups of component (B) is an acrylic polyol.

10. The polyurethane coating composition system according to claim 9, wherein said acrylic polyol has a glass transition temperature of from 30° to 100° C. and a hydroxyl value of from 10 to 150 mgKOH/g of the polyol.

11. The polyurethane coating composition system according to claim 7, wherein the aliphatic and alicyclic diisocyanates of (a) and (b), respectively, have 4 to 30 and 8 to 30 carbon atoms.

12. The polyurethane coating composition system according to claim 11, wherein the diisocyanates of (a) and (b) are each selected from the group consisting of 1,4-tetramethylene diisocyanate, 1,5-pentamethylene diisocyanate, 1,6-hexamethylene diisocyanate, 2,2,4-trimethyl-1,6-hexamethylene diisocyanate, lysine diisocyanate, isophorone diisocyanate, 1,3-bis-(isocyanatomethyl)cyclohexane and 4,4'-dicyclohexylmethane diisocyanate.

13. The polyurethane coating composition system according to claim 12, wherein the diisocyanates of (a) and (b) are each 1,6-hexamethylene diisocyanate.

14. The polyurethane coating composition system according to claim 7, comprising at least one stabilizer selected from the group consisting of a benzotriazole compound, a hindered phenol compound and a hindered amine compound.

* * * * *